Jan. 25, 1966  B. L. SIEGAL  3,230,787

POWER TRANSMISSION APPARATUS

Filed Dec. 18, 1963  2 Sheets-Sheet 1

INVENTOR:
BURTON L. SIEGAL
BY
ATT'Y

Jan. 25, 1966  B. L. SIEGAL  3,230,787
POWER TRANSMISSION APPARATUS
Filed Dec. 18, 1963                                   2 Sheets-Sheet 2

INVENTOR:
BURTON L. SIEGAL
BY
ATT'Y

United States Patent Office 3,230,787
Patented Jan. 25, 1966

3,230,787
POWER TRANSMISSION APPARATUS
Burton L. Siegal, Chicago, Ill., assignor to O'Brien Manufacturing Corporation, Chicago, Ill., a corporation of Illinois
Filed Dec. 18, 1963, Ser. No. 331,458
6 Claims. (Cl. 74—230.17)

The present invention relates to power transmission apparatus and has particular reference to a simplified and automatically operable V-belt and pulley-type power transmission apparatus which, in the various forms of which it is capable of assuming, offers a more versatile range of usefulness than has heretofore been possible in connection with conventional or standard V-belt and pulley-type power transmission apparatus. The invention is specifically concerned with a power transmission apparatus of the type that includes an axially fixed pulley section and an axially shiftable pulley section, the latter being movable toward and away from the axially fixed pulley section automatically according to the combined effect of the load and speed of the driven unit, such shifting of the movable pulley section serving to effect the desired torque conversion or speed change.

The invention consists essentially, in the addition to a conventional V-belt and pulley-type torque conversion or power transmission apparatus, of a fixed diameter sheave, the sheave being incorporated with the axially fixed pulley section, preferably as an integral part of the casing or other body which constitutes the fixed pulley section and serving, alternatively, either as an input sheave or as an output sheave to attain certain unexpected results and extend the usefulness of the improved power transmission apparatus, all in a manner that will become clear when the nature of the invention is better understood.

The subject invention will be found useful in connection with varying types of torque conversion apparatus of the V-belt and pulley-type, regardless of whether the apparatus embodies automatic clutch engagement features by means of which the load may be automatically coupled to or disengaged from the power source at predetermined low speed ranges, or whether the load is permanently coupled to the power source in driven relationship throughout all speed ranges of which the apparatus is capable. Furthermore, the invention is not limited to use in connection with any specific type of centrifugal mechanism for actuating the axially shiftable pulley section of the apparatus, or with any specific type of centrifugal clutch mechanism for rendering the axially fixed pulley section effective when a predetermined speed has been attained, various combinations of these axially fixed and axially shiftable pulley sections being available for adaptation to the present invention. In the exemplary forms of the invention illustrated and described herein, two forms of centrifugally operable axially shiftable pulley sections have been selected for accomplishing the required torque conversion functions of the present invention, while, similarly, two forms of axially fixed pulley sections, one of them embodying a centrifugal clutch and the other being devoid of such a clutch, have been selected, the former fixed pulley section serving merely to extend the range of usefulness of an apparatus otherwise not embodying such a clutch. Irrespective, therefore, of the particular type of torque conversion mechanism that is associated with the axially shiftable pulley section, and the particular type of centrifugally operable clutch or other delayed power transmission mechanism that is associated with the axially fixed pulley section, or of either the use or nonuse of such a delayed power transmission mechanism, the essential features of the present invention are at all times preserved.

The uses to which the present power transmission apparatus may be put are varied and numerous. Several exemplary uses have been illustrated herein, each illustrated use being capable of numerous specific applications. In general, it may be stated that the present invention has been designed, preferably, but not necessarily, for use in the lower horsepower ranges of gasoline engines and electric motors, for example, in the 1 to 25 horsepower range. Exemplary of the general uses to which the present invention may be put are: the selective coupling of two power sources to a common load for drive of the load by either or both power sources; the selective coupling of a single power source to dual loads for driving the latter at wide or narrow speed ranges; the coupling, by a remote mounting of the apparatus, of a single power source directly to one or more loads, together with the provision of a variable speed drive to an additional load, with or without the facilities of an automatically operable centrifugal delayed clutch; and the coupling, likewise by a remote mounting of the apparatus, of a single high-speed power source to a single load through a centrifugal delayed action clutch.

The provision of an apparatus of the character briefly outlined above being among the principal objects of the invention, numerous other objects and advantages, not at this time enumerated, will readily suggest themselves as the nature of the invention is better understood.

In the accompanying two sheets of drawings forming a part of this specification, several illustrative embodiments of the invention have been shown.

Figure 1:
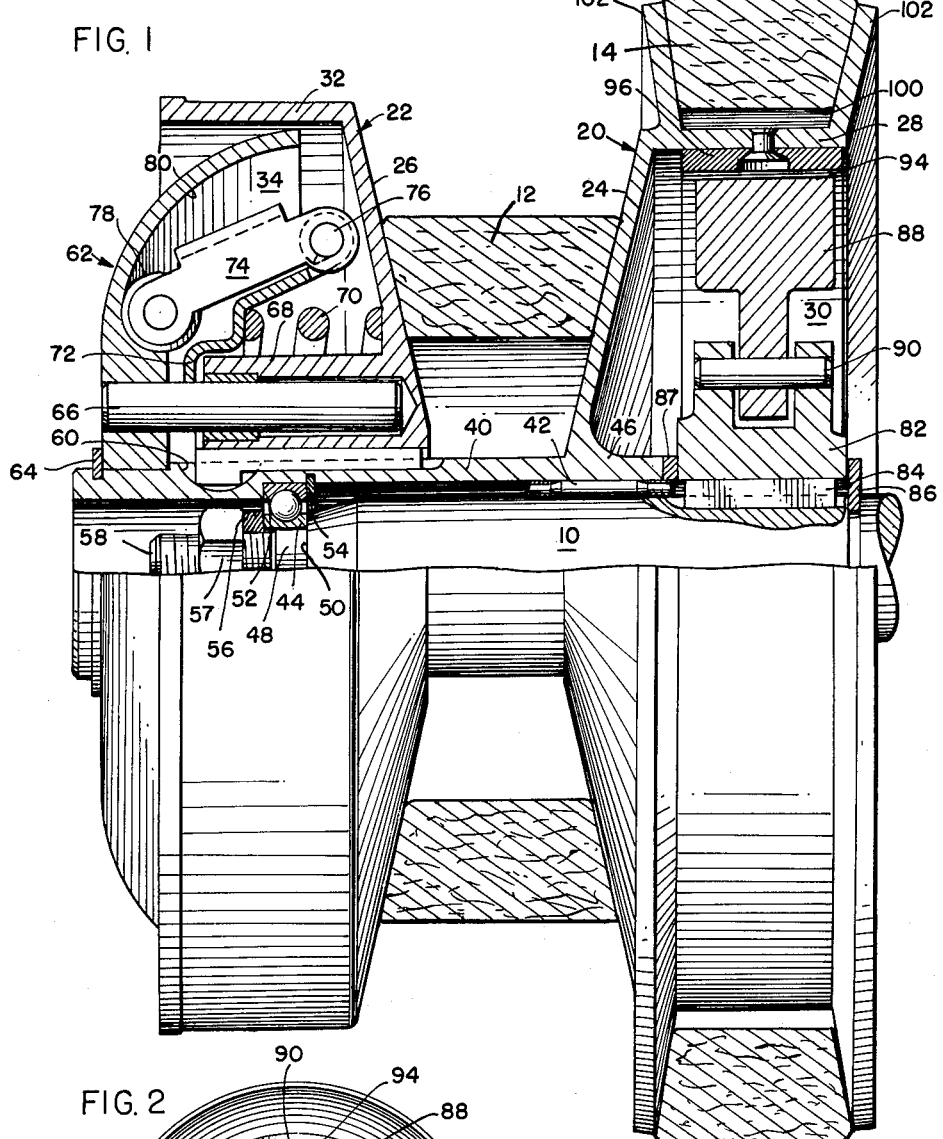
FIG. 1 is a side elevational view, partly in vertical section, of a power transmission apparatus constructed in accordance with the principles of the invention.
Figure 2:
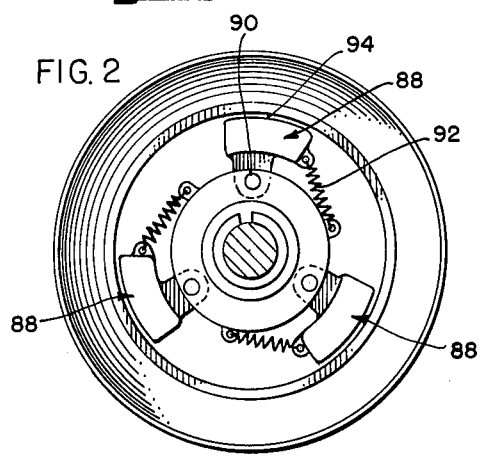
FIG. 2 is a reduced rear end elevational view of the apparatus that is shown in FIG. 1.

Referring now to the drawings in detail, and in particular to FIGS. 1 and 2, by way of illustration, the improved power transmission apparatus of the present invention, in one embodiment thereof, is shown as being in a form that is adapted operatively to connect a drive shaft 10 to a V-belt 12, it being clear that in actual use, the shaft 10 is driven by a suitable source of power (not shown), while the belt 12 drives a desired piece of machinery or other equipment that is capable of being driven. The shaft 10 also is adapted to drive a second V-belt 14, in which case, both belts 12 and 14 may be regarded as being output elements of the present power transmission apparatus. Under certain conditions of use, and as will be described in greater detail presently, the shaft 10 is adapted to be assisted in its driving function by the V-belt 14, in which case, this latter belt, instead of constituting an output element of the transmission, constitutes an input element thereof. In certain installations, the belt 14 may function selectively as both an input and an output element, an example of such selective use being an instance where the ment of the transimssion, constitutes an input element combustion engine (not shown) through the belt 14 for cranking purposes until such time as the engine is self-sustaining, after which time the engine will transmit power back to the transmission apparatus by way of the V-belt 14 in order to assist the shaft 10 in driving such machinery as may be connected to the belt 12. A wide variety of other uses for the present transmission apparatus are contemplated and in FIGS. 4 and 5, two installations, respectively, of the transmission apparatus of FIG. 1 have been illustrated. A better understanding of these latter illustrations may be had after the nature of the power transmission apparatus itself has been set forth.

The power transmission apparatus of FIG. 1 is in the form of a variable pitch pulley structure and embodies a centrifugal clutch mechanism for energizing the belts 12 and 14 at a predetermined minimum speed of rotation of the shaft 10. Accordingly, the transmission apparatus involves in its general organization a split pulley arrangement which is mounted on the shaft 10 and includes an axially fixed pulley section 20 and an axially shiftable pulley section 22, the two sections presenting, respectively, sloping belt-engaging frusto-conical wall surfaces 24 and 26 which engage the correspondingly sloping side surfaces of the belt 12 and increase the pitch of the belt as the pulley section 22 moves towards or closer to the pulley section 20. The pulley section 20 is preferably in the form of a one-piece casting and embodies a cylindrical wall 28 which, in combination with the sloping wall 24 of the pulley section 20, partially encloses a centrifugal clutch mechanism. The latter is designated in its entirety by the reference numeral 30. The pulley section 22 is also preferably in the form of a casting and embodies a cylindrical wall 32 which, in combination with the sloping wall 26 of the pulley section 22, partially encloses a centrifugally operable speed-change mechanism which is designated in its entirety by the reference numeral 34.

The centrifugal clutch mechanism 30 and the centrifugal speed-change mechanism 34 are of well-known types and no claim is made herein to any novelty associated with them. These mechanisms are merely exemplary clutch and speed-change mechanisms which, in combination with each other and in combination with other structure that is associated with the present power transmission apparatus, make possible the results sought to be attained by the present invention. Other types of centrifugal clutch and speed-change mechanism are available for use in connection with the present invention and they may be substituted at will for the present illustrated mechanisms 30 and 34.

The pulley section 20 is provided with a forwardly projecting hub 40 in the form of a sleeve which surrounds the shaft 10 and is rotatably supported at its end portions on anti-friction bearings 42 and 44. The bearing 42 is in the form of a needle bearing and is partially enclosed by a rearward extension 46 of the forwardly projecting hub 40. The bearing 44 is in the form of a thrust bearing. It seats on a reduced forward portion 48 on the drive shaft 10 and bears against an annular shoulder 50 on the shaft 10. The outer race of the bearing 44 is centered between a shoulder 52 on the hub and a snap ring 54. The inner race of the bearing 44 is centered between the shoulder 50 and a washer 56, the latter being held in position by a nut 57 on the threaded end region of the shaft 10.

The pulley section 22 is axially slidable on the hub 40 and is keyed as at 60 to the hub for rotational movements in unison therewith. This pulley section has associated therewith a reaction cup 62 which is held against forward movement on the shaft 10 by a thrust ring 64. The reaction cup is provided with a thickened hub portion from which three projects rearwardly one or more drive pins 66, the latter slidably projecting into relatively deep-socketed bosses 68 on the pulley section 22. These drive pins serve to maintain a constant circumferential relationship between the reaction cup 62 and the pulley section 22, or in other words, to cause these two parts to rotate in unison.

The pulley section 22 is movable between a position of close proximity to the pulley section 20 wherein the effective diameter of the split pulley as a whole is at a maximum, and a position of wide separation from the pulley section 20 wherein the effective diameter of the split pulley is at a minimum. The pulley section 22 is normally and yieldingly maintained in its position of close proximity to the pulley section 20 by means of a helical compression spring 70 which bears at one end against the inside or forward face of the sloping wall surface 26 of the pulley section 22, and at its other end against a spider 72 to which there are pivoted at spaced points therearound cam weights 74. Each cam weight 74 is pivoted at one end thereof of the spider 72 by means of a pin 76, the other end of the weight carrying a cam roller 78 which is designed for rolling cam engagement with the curved inside rim region 80 of the reaction cup 62.

In the operation of the speed-change mechanism 34, the tension existing in the belt 12 serves to maintain the pulley section 22 in its position of wide separation from the pulley section 20 against the yielding action of the compression spring 70. It will be understood, of course, that the split pulley arrangement of the present invention constitutes a driving pulley for the belt 12 and that this belt may have associated therewith a remote and counterpart split driven pulley arrangement including relatively movable pulley sections, the movements of which take place in reverse relationship to the "opening" and "closing" movements of the pulley sections 20 and 22. In the position in which it is illustrated in FIG. 1, the pulley section 22 is shown as being in a position of wide separation from the pulley section 20, the tension of the belt 12 overcoming the compressional force of the spring 70. As a consequence, the pulley assembly is in a position of low belt pitch, this being the normal position of the parts when the pulley assembly is at rest. Upon outward radial swinging movements of the cam weights 74 as the speed of the pulley section 22 increases, the cam rollers 78 ride outwardly on the peripheral region of the reaction cup 62, thus forcing the spider 72 rearwardly away from the reaction cup 62 and exerting pressure upon the pulley section 22 through the compression spring 70 so as to force the pulley section 22 toward the axially fixed pulley section 20 to increase the belt pitch.

The centrifugal clutch 30 which is associated with the axially fixed pulley section 20 includes a rotor 82 which is keyed as at 84 to the shaft 10 and is held in position against axial shifting by two thrust rings 86 and 87 on opposite sides thereof. The clutch also includes an annular series of circumferentially spaced weighted clutch shoes 88. The latter are pivoted on pins 90 to the periphery of the rotor 82 and normally are maintained in retracted positions by means of individual helical tension springs 92 (see FIG. 2). The clutch shoes 88 are provided with outer arcuate friction surfaces 94 which are designed for frictional engagement with a friction lining 96 on the inside face of the cylindrical wall 28 of the pulley section 20.

In the operation of the centrifugal clutch mechanism 30, at speeds below a predetermined minimum speed, the shaft 10 and the rotor 82 will rotate freely and without function inasmuch as the only potential driving connection between the shaft and the power transmission apparatus of the present invention is through the medium of the centrifugal clutch mechanism 30. At such low speeds, the weighted clutch shoes 88 will remain retracted with the result that the shaft 10 will simply rotate in the bearings 42 and 44 without function. At such time as the shaft 10 attains the predetermined minimum speed of rotation, the clutch shoes 88 will, under the influence of centrifugal force, engage the friction lining 96, thus engaging the clutch mechanism 30 and transmitting torque from the shaft 10 to the axially fixed pulley section 20. The axially slidable pulley section 22, being keyed to the hub 40 of the axially fixed pulley section 20, will also derive rotational movement from the shaft 10 and, in turn, this latter section 22 will transmit rotational movement to the reaction cup 62 by way of the drive pin 66. The belt 12, being in frictional contact with the sloping wall surfaces 24 and 26 of the two pulley sections 20 and 22, will thus become energized and, thereafter, the driving pitch of the belt will be a function of the relative spacing between the two pulley sections 20 and 22 as controlled by the functioning of the previously described centrifugal speed-change mechanism 34.

The arrangement of parts thus far described, with the exception of a mention of the belt 14, is more or less conventional, and no claim is made herein to any novelty associated with the same, the novelty of the present invention residing rather in the novel association of the belt 14 with the transmission apparatus thus far described. The belt 14 seats within an integrally formed sheave 100 on the outer rim portion of the pulley section 20, the sheave trough being provided by the cylindrical wall 28 of the pulley section 20 and the sheave sides being provided by a pair of outwardly and oppositely inclined sheave walls or flanges 102. The effective pitch of the belt 14 is thus slightly greater than the maximum effective pitch of which the belt 12 is capable of assuming. In most of the contemplated installations of the present transmission apparatus, the sheave 100 will constitute an output sheave by means of which power is transmitted from the shaft 10 to a piece of machinery or a sub-assembly thereof. However, in certain instances, the sheave 100 may constitute an input sheave for the power transmission apparatus. In either event, the essential features of the apparatus remain substantially the same.

Figure 4:
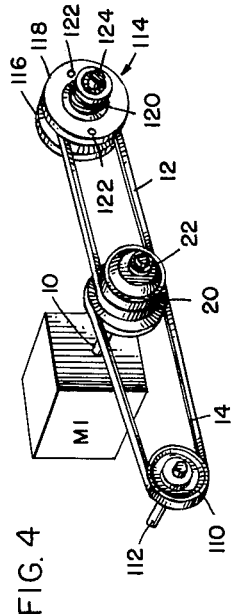
FIG. 4 is a schematic perspective view of the apparatus of FIG. 3, illustrating use of the apparatus in the selective transmission of power from a single power source to two different loads.

As previously stated, the power transmission apparatus of FIG. 1 is capable of a wide variety of uses, and the illustration of FIG. 4 is a schematic representation of certain of these contemplated uses. One of its principal uses is in the field of self-propelled power tools or equipment involving plural power trains, one of which is employed for tractionally propelling the vehicle which constitutes a part of the equipment. Self-propelled lawnmowers, street sweeping vehicles, beach combing machines, snow plows, tractors, and certain other forms of farm equipment are but a few examples of equipment of this type and for which the present invention is suited. The invention also is useful in connection with equipment which may or may not be self-propelled and employs plural power trains, one of which is required to deliver torque at a fixed or narrow speed ratio and the other of which is required to deliver torque at a wide speed ratio. Such a use is exemplified by a sewer rodding machine of the type that is shown and described in United States Patent No. 3,106,734, granted to me on October 15, 1963, and entitled "Rod Drive Unit for a Sewer Cleaning Machine." Such a machine embodies a first power train for effecting rotation of a rod-receiving storage basket and a second power train for feeding a flexible sectional sewer cleaning rod out of and into the basket for introduction thereof into or withdrawal thereof from the sewer undergoing cleaning. Rotation of the basket at substantially a constant speed is desirable while the axial movements of the rod may vary to suit varying requirements.

These and other contemplated similar uses for the power transmission apparatus of FIG. 1 have been illustrated in FIG. 4 wherein a power source or prime mover has been designated as M1, the shaft 10 of the apparatus of FIG. 1 constituting the drive shaft of the prime mover M1. The belt 14 which is carried on the axially fixed section 20 is operatively connected to a pulley 110 on an input shaft 112 which constitutes the power input shaft of one power train associated with the machine or equipment being operated, for example, the power train leading to the cutting blades of a power lawnmower or the power train leading to the rotating storage basket of a sewer cleaning machine. The belt 12 which cooperates with both sections 20 and 22 extends to a spring-pressed pulley arrangement 114 of the type that is commonly employed in connection with "Reeves" and other drive mechanisms and includes a fixed pulley section 116, an axially shiftable pulley section 118, and a spring 120 for yieldingly urging the pulley section 114 towards the pulley section 116. Drive pins 122 interconnect the two pulley sections 116 and 118 and the pulley section 116 is fixed to and rotates with the shaft 124 on which it is mounted, this shaft constituting the input power shaft of another power train that is associated with the machine or equipment being operated, for example, the power train leading to the traction wheels of the aforementioned power lawnmower or the power train leading to the rod-driving mechanism of the aforementioned sewer cleaning machine.

Figure 5:
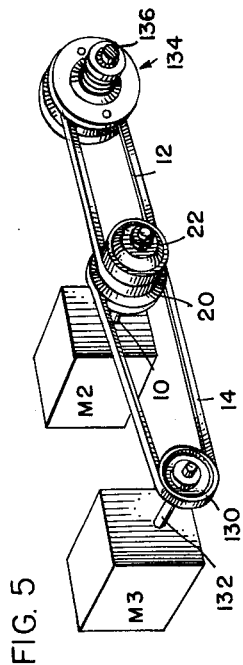
FIG. 5 is a schematic perspective view of the apparatus of FIG. 1, illustrating use of the apparatus in the selective coupling of two power sources to a single load.

In FIG. 5, the power transmission apparatus of FIG. 1 is shown as being operatively installed in equipment which embodies two power sources or prime movers M2 and M3, either or both of which are adapted to drive a given load. The prime mover M2 has an output or drive shaft which constitutes the shaft 10 of the power transmission mechanism of FIG. 1. The belt 14 is connected to a fixed ratio pulley 130 on the drive shaft 132 of the prime mover M2, while the belt 12 extends to a split pulley arrangement 134 which is identical with the previously described split pulley arrangement 114 and is carried or mounted on a shaft 136, the latter shaft representing a load shaft to be driven. An installation of this type will be found useful where the prime mover M2 is employed simply as a starting motor for the prime mover M3, in which case the prime mover M2 may be an electric motor, while the prime mover M3 may be an internal combustion engine. Upon energization of the prime mover M2, the shaft 10 will rotate until such time as the required speed of rotation thereof for operation of the centrifugal clutch mechanism 30 has been attained, after which this mechanism will become engaged, thereby setting the two pulley sections 20 and 22 into motion and serving to energize both belts 12 and 14. The belt 12 will pick up the load as soon as the centrifugal clutch mechanism 30 becomes effective to transmit the rotary motion of the shaft 10 to the pulley sections 20 and 22, thus bringing the load up to running speed or at least overcoming the initial load inertia. Simultaneously, the belt 14 will transmit cranking power to the prime mover M3 to start the same and, after the prime mover M3 is self-sustaining, it may be employed as the sole driving means for the load. In such an instance, the prime mover M2 may be deenergized and the drive shaft will serve merely to transmit idling rotation to the armature of the prime mover M2, while at the same, driving the load through the media of the belt 12. Alternatively, and by the simple expedient of allowing the prime mover M2 to remain energized, both prime movers M2 and M3 may be caused to drive the load in tandem. If starting facilities other than the prime mover M2 are available for the prime mover M3, this latter power source may be employed to drive the load initially through the belt 12, the prime mover M2 remaining inoperative as long as desired.

Figure 3:
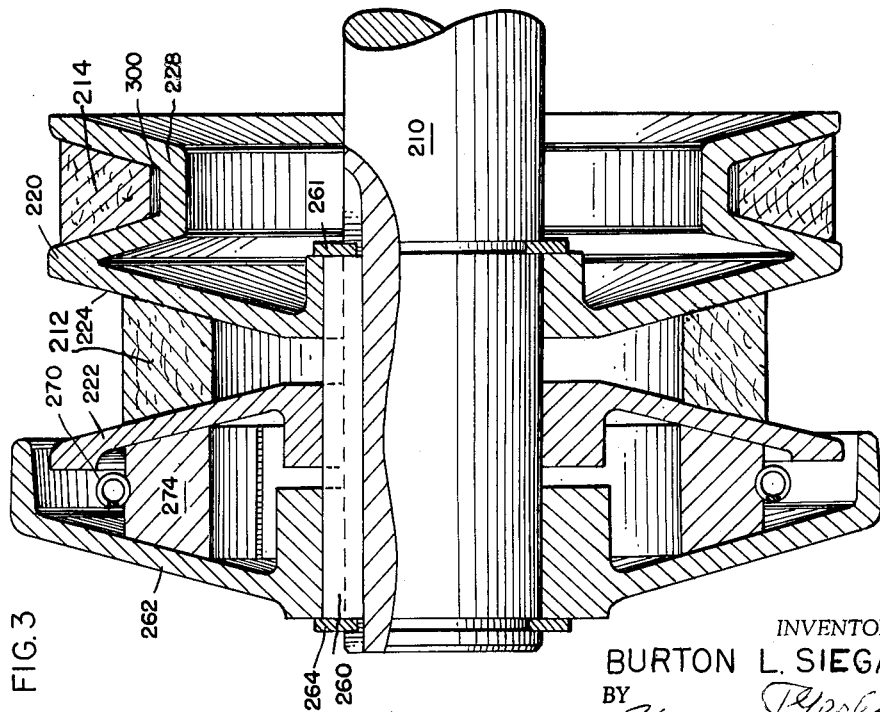
FIG. 3 is a side elevational view similar to FIG. 1 but showing a modified form of the invention.

In FIG. 3, a modified form of power transmission apparatus is illustrated. In this form of the invention, the arrangement of parts is sufficiently similar to the arrangement of the parts of the apparatus of FIG. 1 that the application of reference numerals of a higher order to the corresponding parts in the two views will serve to avoid needless repetition of description.

In FIG. 3, the axially fixed pulley section 220, the axially shiftable pulley section 222, and the reaction cup 262 are keyed as at 260 in common to the shaft 210, and the pulley section 220 is maintained against shifting in one direction by a thrust washer 261. Said pulley section 220 is maintained against axial shifting in the other direction by the force of the belt 212 bearing against the inclined wall surface 224 thereof. The centrifugally operable speed-change mechanism that is associated with the pulley section 222 includes a series of circumferentially arranged arcuate fly-weights 274 which are encompassed by the pulley section 222 and the reaction cup 262 and are held in their retracted innermost radial position by a circumferential tension or garter spring 270. The fly-weights 174 have inclined side surfaces which bear against the opposed inclined surfaces of the reaction cup 262 and the pulley section 222, respectively. The reaction cup 262 is prevented from outward shifting on the shaft 210 by a thrust washer 264. Upon outward radial movement of the fly-weights 274 under the influence of centrifugal force, which force is resisted by the spring 270, the fly-weights 274 wedge the axially shiftable pulley section 222 toward the axially fixed pulley section 220, the belt 212 being confined between these two sections. As the speed of rotation of the shaft 210, and consequently, of the two pulley sections 220 and 222, increases the axial force of the fly-weights 274 upon the pulley section 220 will result in an increase in the pitch of the belt 212 as is the case in connection with centrifugal speed-change mechanisms of this general type.

The belt 214 is confined between the opposed inclined side wall surfaces of a sheave 300 which is formed on the outer rim portion of the pulley section 220. It is to be noted that the cylindrical bottom wall 228 lies well within the peripheral confines of the pulley section 220, the sheave walls being in the form of reentrant flanges on the sheave casting instead of external flanges as is the case in connection with the sheave 100 of the apparatus of FIG. 1. By such an arrangement, the fixed diameter of the sheave 300 may be made no greater than the maximum effective diameter of the variable pitch pulley afforded by the two pulley sections 220 and 222 although under certain circumstances, it may be made of greater diameter.

Figure 6:
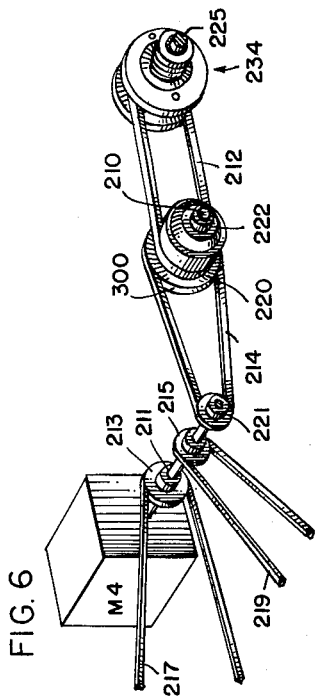
FIG. 6 is a schematic perspective view of the apparatus of FIG. 3, illustrating use of such apparatus as a remote power transmission coupling, embodying a delayed clutch between a single power source and plural loads.

The modified form of power transmission apparatus that is shown in FIG. 3 may find use in connection with the schematically shown installation of FIG. 6 where the specific requirements of the installation do not necessarily involve the use of a delayed action or lagging clutch mechanism. The transmission apparatus of FIG. 3 may find wide use in connection with relatively high-speed prime movers, such as turbines, series-wound electric motors, two-cycle internal combustion engines, and the like where the design of a speed-change transmission of the V-belt type capable of withstanding such speeds would otherwise be generally impractical. In FIG. 6, the transmission apparatus of FIG. 3 is remotely disposed with respect to the prime mover M4, the shaft 210 thereof being freely rotatable. The prime mover M4 is provided with an output shaft 211 which is provided with take-off pulleys 213 and 215. The latter, by means of belts 217 and 219, respectively, are operatively connected to power trains that are associated with various power equipment to be driven. A small diameter pulley 221 receives the belt 214 thereover and the belt 212 of the power transmission apparatus is operatively associated with a reverse acting split pulley arrangement 234 that is similar to the split pulley arrangements 114 and 134. The split pulley arrangement 234 is operatively mounted upon a shaft 225 which may constitute the input shaft of any desired power-driven equipment requiring a variable speed ratio drive. In the installation of FIG. 6, the fixed ratio sheave 300 thus constitutes an input sheave for the transmission apparatus of FIG. 3, while the pulley sections 220 and 222 constitute a variable speed output pulley therefor. The installation of FIG. 6 will be found especially useful in connection with a prime mover whose output shaft is of limited axial extent or where it would otherwise be impractical to mount the split pulley assembly (220, 222) directly on such output shaft due to the presence of other members on the shaft.

The invention is not to be limited to the exact arrangement of parts shown in the accompanying drawings or described in this specification as various changes in the details of construction may be resorted to without departing from the spirit or scope of the invention. For example, the forms of the centrifugal speed-change mechanism and of the delayed action centrifugal clutch selected for exemplary purposes herein may be replaced by other forms of such mechanisms capable of performing substantially the same speed-change and delayed action clutch functions. Neither is the invention to be limited to the exemplary installations illustrated in FIGS. 4, 5 and 6, nor to the specific uses mentioned in connection with these installations since a wide variety of other installations and uses are contemplated for the present invention. Therefore, only insofar as the invention has particularly been pointed out in the accompanying claims is the same to be limited.

Having thus described the invention, what I claim as new and desire to secure by Letters Patent is:

1. In a speed-change power transmission of the character described, in combination, a rotatable shaft, a split pulley on said shaft including an axially fixed pulley section and an axially slidable pulley section, each of said pulley sections having a hub portion from which there projects outwardly a frusto-conical wall, the two frusto-conical walls defining therebetween a variable width V-groove for reception therein of a V-belt whereby the effective diameter of the pulley is a function of groove width, means connecting said pulley sections and shaft for conjoint rotation in unison, centrifugally responsive means for shifting said axially slidable pulley section toward and away from said axially fixed pulley section, a cylindrical wall projecting laterally from the large base of the frusto-conical wall, and a pair of inclined sheave walls projecting generally radially outwardly from said cylindrical wall and, in combination therewith, defining a fixed width V-groove for reception therein of a second V-belt.

2. In a speed-change power transmission, the combination set forth in claim 1, and wherein the effective diameter of said fixed width V-groove is greater than the maximum effective diameter of the variable width V-groove.

3. In a speed-change power transmission of the character described, in combination, a rotatable shaft, a split pulley on said shaft including an axially fixed pulley section and an axially slidable pulley section, each of said pulley sections having a hub portion from which there projects outwardly a frusto-conical wall, the two frusto-conical walls defining therebetween a variable width V-groove for reception therein of a V-belt whereby the effective diameter of the pulley is a function of groove width, means connecting said pulley sections for conjoint rotation in unison, centrifugally responsive means for shifting said axially slidable pulley section toward and away from said axially fixed pulley section, centrifugal clutch means operable when said shaft attains a predetermined speed of rotation for establishing a driving connection between the shaft and said fixed pulley section, and means on one of said pulley sections defining a sheave presenting a V-groove for reception therein of a second V-belt.

4. In a speed-change power transmission of the character described, in combination, a rotatable shaft, a split pulley on said shaft including an axially fixed pulley section and an axially slidable pulley section, each of said pulley sections having a hub portion from which there projects outwardly a frusto-conical wall, the two frusto-conical walls defining therebetween a variable width V-groove for reception therein of a V-belt whereby the effective diameter of the pulley is a function of groove width, means connecting said pulley sections for conjoint rotation in unison, centrifugally responsive means for shifting said axially slidable pulley section toward and away from said axially fixed pulley section, centrifugal clutch means operable when said shaft attains a predetermined speed of rotation for establishing a driving connection between the shaft and said fixed pulley section, and means on said axially fixed pulley section defining a sheave presenting a V-groove for reception therein of a second V-belt.

5. In a speed-change power transmission of the character described, in combination, a rotatable shaft, a split pulley on said shaft including an axially fixed pulley section and an axially slidable pulley section, each of said pulley sections having a hub portion from which there projects outwardly a frusto-conical wall, the two frusto-conical walls defining therebetween a variable width V-groove for reception therei nof a V-belt whereby the effective diameter of the pulley is a function of groove width, means connecting said pulley sections for conjoint rotation in unison, centrifugally responsive means for shifting said axially slidable pulley section toward and away from said axially fixed pulley section, centrifugal clutch means operable when said shaft attains a predetermined speed of rotation for establishing a driving connection between the shaft and said fixed pulley section, a cylindrical wall projecting laterally from the large base of the frusto-conical wall, and a pair of inclined sheave walls projecting generally radially outwardly from said cylindrical wall and, in combination therewith, defining a fixed width V-groove for reception therein of a second V-belt.

6. In a speed-change power transmission of the character described, in combination, a rotatable shaft, a split pulley on said shaft including an axially fixed pulley section and an axially slidable pulley section, each of said pulley sections having a hub portion from which there projects outwardly a frusto-conical wall, the two frusto-conical walls defining therebetween a variable width V-groove for reception therein of a V-belt whereby the effective diameter of the pulley is a function of groove width, means connecting said pulley sections and shaft for conjoint rotation in unison, centrifugally responsive means for shifting said axially slidable pulley section toward and away from said axially fixed pulley section, the outer rim of the frusto-conical wall of the axially fixed pulley section being provided with a reentrant flange and a second reentrant flange connected to the inner rim of the first reentrant flange, the two reentrant flanges defining therebetween a second V-groove designed for reception therein of a second V-belt.

References Cited by the Examiner
UNITED STATES PATENTS

| | | | |
|---|---|---|---|
| 2,104,074 | 1/1938 | Erbach | 74—230.24 X |
| 2,521,884 | 9/1950 | Thostenson | 74—230.24 |
| 2,556,512 | 6/1951 | Ammon | 74—230.17 |
| 2,928,286 | 3/1960 | Davis | 74—230.17 |

DAVID J. WILLIAMOWSKY, *Primary Examiner.*
DON A. WAITE, *Examiner.*
L. H. GERIN, *Assistant Examiner.*